No. 95558

Impt. Cider Press.

PATENTED OCT 5 1869

Witnesses
Geo. G. Sill
Wm. W. Shipman

Inventor
Asa Brooks
By Ellis & Sir
Attys.

United States Patent Office.

ASA BROOKS, OF TOLLAND, CONNECTICUT.

Letters Patent No. 95,558, dated October 5, 1869.

---

IMPROVEMENT IN CIDER-PRESSES.

---

The Schedule referred to in these Letters Patent and making part of the same.

---

*To all whom it may concern:*

Be it known that I, ASA BROOKS, of Tolland, in the county of Tolland, and State of Connecticut, have invented a new and useful Improvement in Cider-Presses; and I declare the following to be a full and exact description thereof, reference being had to the accompanying drawings, and to the letters of reference thereon, forming a part of this specification.

In the drawings—

Like letters indicate like parts.

The letter $a$ indicates the frame of the machine.

Power is applied by the handle $s$, always in the direction of the arrow.

The cog-wheel $b$ is made adjustable backward and forward, so that it may be thrown in or out of gear with the cog-wheel $c$, which, by means of the bevel-gear wheels $e$ and $f$, drives the pillar-gear $h$, which, in its turn, drives the gears $i^1$ $i^2$ $i^3$ $i^4$, and with them the screws $z$ $z$ $z$ $z$, to which they are severally attached.

These screws turn in female screws in the platform $j$, and as the threads are of equal pitch, they will all run down or up together.

The letter $k$ indicates a sliding platform, having fixed bearings for the four screws, and as the screws move up or down, the platform slides upon guides at the four corners $l$ $l$ $l$ $l$.

Under the lower end of the screws at $m$ $m$, a "cheese" of apples, or the like, can be pressed.

Figure 1:
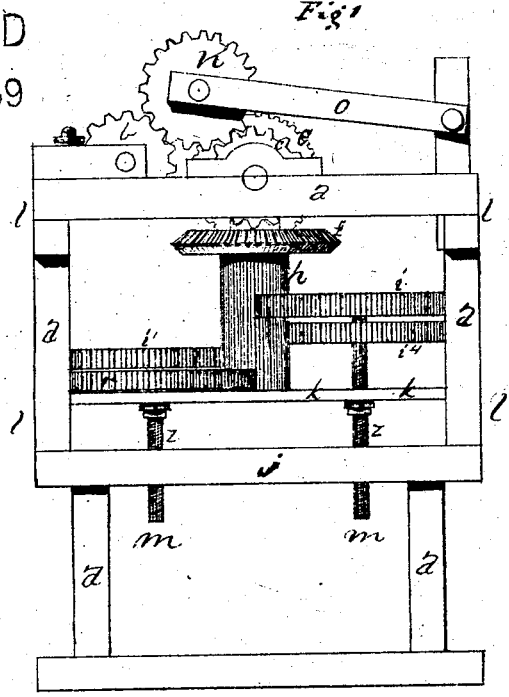
Figure 1 is an end elevation.
Figure 2:
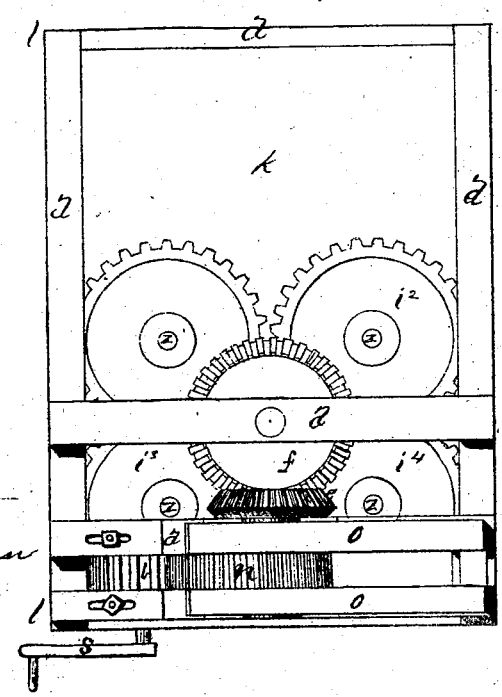
Figure 2 is a plan view.

The screws having been run down as far as desired, the cog-wheel $b$ is moved back out of gear with $c$, the cog-wheel $n$, fixed in the swinging-arm $o$, is thrown down so as to gear into both $b$ and $c$, as shown in fig. 1.

Now, the cog-wheel $b$ being allowed in the same direction as before, the direction of $c$ is reversed, and the screws are run up to any desired point.

I claim as my invention—

The combination of the pillar-gear $h$, the gear-wheels $i^1$ $i^2$ $i^3$ $i^4$, the screws $z$ $z$ $z$ $z$, and the sliding platform $k$, the whole being arranged, constructed and operated as described, for the purpose set forth.

Also, the combination of the adjustable cog-wheel $b$, the swinging cog-wheel $n$, the cog-wheel $c$, the bevel-gear wheels $e$ and $f$, and the parts specified in the preceding clause, the whole being arranged, constructed, and operated as described, for the purposes set forth.

ASA BROOKS.

Witnesses:
E. R. BISHOP,
JOSEPH BISHOP.